United States Patent
Van Gorkom et al.

(10) Patent No.: US 6,188,178 B1
(45) Date of Patent: Feb. 13, 2001

(54) FLAT-PANEL PICTURE DISPLAY DEVICE WITH SPACER MEANS ADJACENT THE DISPLAY SCREEN

(75) Inventors: Gerardus G. P. Van Gorkom; Petrus H. F. Trompenaars; Siebe T. De Zwart; Nicolaas Lambert, all of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 08/422,667

(22) Filed: Apr. 10, 1995

Related U.S. Application Data

(63) Continuation of application No. 08/223,375, filed on Apr. 5, 1994, now abandoned, which is a continuation of application No. 08/151,586, filed on Nov. 12, 1993, now abandoned, which is a continuation of application No. 07/802,955, filed on Dec. 2, 1991, now abandoned, which is a continuation-in-part of application No. 07/830,951, filed on Feb. 6, 1992, now Pat. No. 5,313,136, which is a continuation of application No. 07/528,677, filed on May 24, 1990, now abandoned.

(30) Foreign Application Priority Data

Dec. 3, 1990 (NL) .................................................. 9002643

(51) Int. Cl.$^7$ ....................................................... G09G 3/10
(52) U.S. Cl. ..................... 315/169.1; 315/12.1; 313/422; 313/495
(58) Field of Search ........................ 315/3, 169.1, 169.3, 315/12.1, 366; 313/422, 495, 103, 103 CM, 399, 400, 346 R

(56) References Cited

U.S. PATENT DOCUMENTS

| | | | |
|---|---|---|---|
| 3,873,870 | * 3/1975 | Fukushima | 315/169.1 |
| 4,041,343 | * 8/1977 | Orthuber | 315/12.1 |
| 4,099,079 | * 7/1978 | Knapp | 313/346 R |
| 4,626,899 | * 12/1986 | Tomii et al. | 313/422 |
| 4,873,472 | * 10/1989 | Freeman | 315/366 |
| 4,881,005 | * 11/1989 | Morimoto et al. | 313/422 |
| 4,956,575 | * 9/1990 | Chang | 313/422 |
| 5,313,136 | * 5/1994 | Van Gorkom et al. | 313/422 |

FOREIGN PATENT DOCUMENTS

| | | |
|---|---|---|
| 79108 | * 5/1983 | (EP) . |
| 400750 | * 12/1990 | (EP) . |

OTHER PUBLICATIONS

Ljamitscher, "Device for Displaying Information with Flat Screens", Radio and Communications, 1983 pp. 36,37,39, 135,147,154,160 "Webster's Ninth New Collegiate Dictionary" 1986 p. 105.*

* cited by examiner

Primary Examiner—Michael B Shingleton

(57) ABSTRACT

Picture display device having a vacuum envelope with a face plate whose inner side is provided with a luminescent screen having a repetitive pattern of triplets of red, green and blue-luminescing phosphor elements, a rear plate at a short distance therefrom and in the space therebetween a plurality of electron emitters and juxtaposed, electron ducts cooperating therewith and having walls of substantially electrically insulating material having a secondary emission coefficient suitable for electron transport for transporting, through vacuum, produced electrons in the form of electron currents. Means are provided for withdrawing each electron current at predetermined locations from its duct and for directing this current towards a desired location on the luminescent screen for producing a picture composed of pixels.

33 Claims, 3 Drawing Sheets

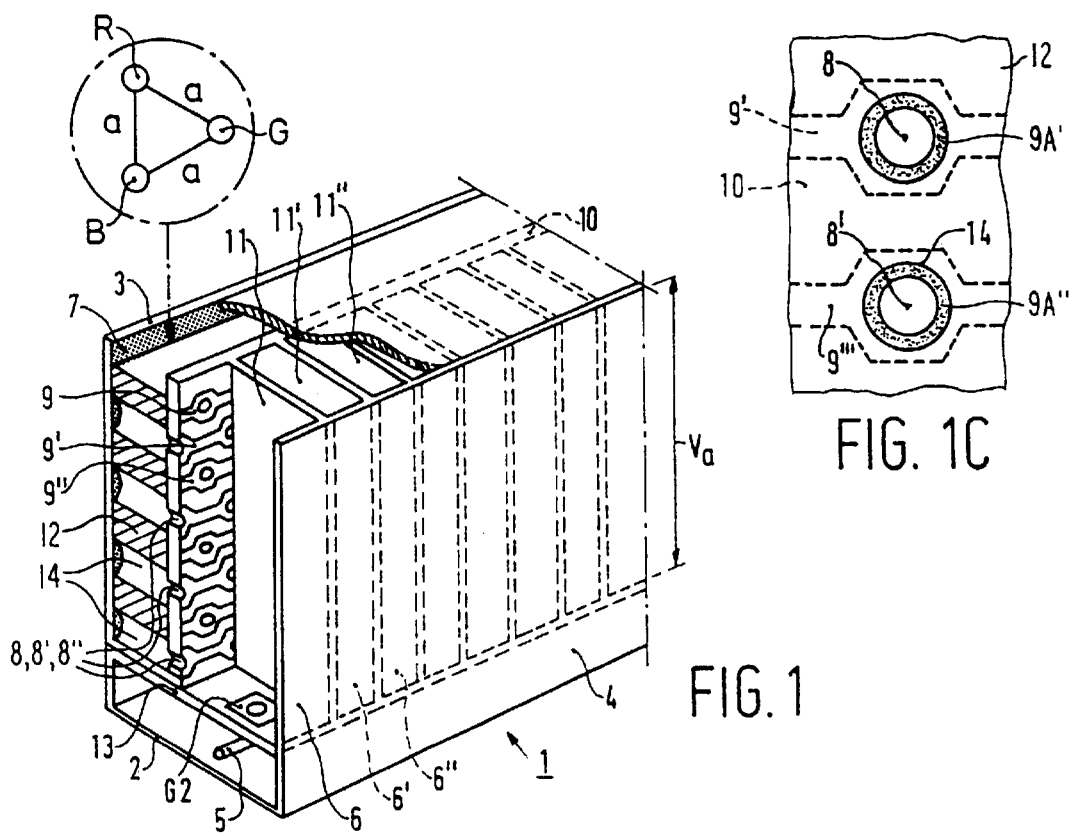
FIG. 1
FIG. 1C
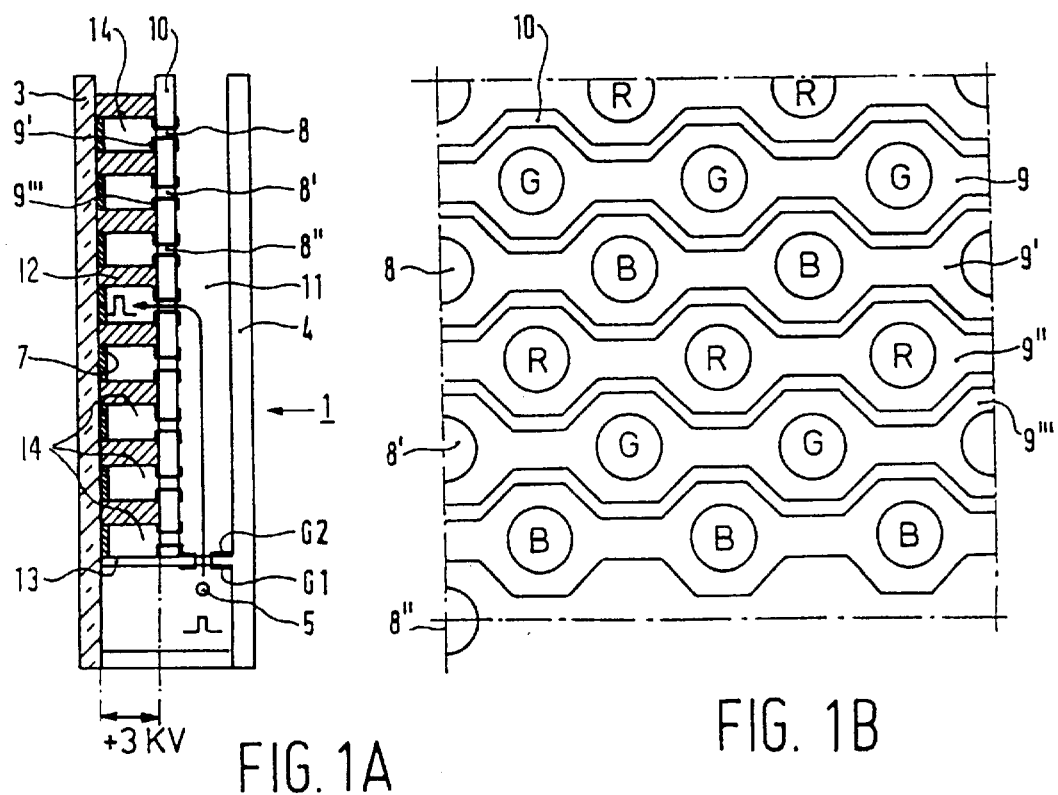
FIG. 1A
FIG. 1B

FLAT-PANEL PICTURE DISPLAY DEVICE WITH SPACER MEANS ADJACENT THE DISPLAY SCREEN

CROSS REFERENCE TO RELATED APPLICATION

This is a continuation of application Ser. No. 08/223,375, filed Apr. 5, 1994, now abandoned which is a continuation of application Ser. No. 08/151,586, filed on Nov. 12, 1993 now abandoned, which is a continuation of application Ser. No. 07/802,955, filed Dec. 2, 1991 now abandoned, which is a continuation-in-part of application Ser. No. 07/830,951, filed Feb. 6, 1992, now U.S. Pat. No. 5,313,136 which is a continuation of application Ser. No. 07/528,677, filed May 24, 1990 now abandoned.

BACKGROUND OF THE INVENTION

The invention relates to a color picture display device having a vacuum envelope, and including a front wall a, luminescent screen, and a rear wall, and particularly relates to a flat-panel picture display device (i.e. a picture display device having a small "front-to-back dimension") which is clearly distinguished from state-of-the-art display devices.

Many research efforts in the field of picture display devices of the flat-panel type relate to devices having a transparent face plate and a rear plate which are interconnected by means of side walls and in which the inner side of the face plate is provided with a phosphor pattern, one side of which is provided with an electrically conducting coating (the combination generally being referred to as luminescent screen). A large number of electron-beam-producing means is generally arranged on the rear plate and a large number of deflection means is provided to cause each electron beam produced to scan a part of the luminescent screen. If video-information-controlled electron beams impinge upon the luminescent screen, a visual image is formed which is visible via the front side of the face plate. (The expression electron beam is understood to mean that the paths of the electrons in the beam are substantially parallel, or extend only at a small angle to one another, and that there is a main direction in which the electrons move.) The electron-beam controlled devices hitherto known require, inter alia, complicated electron-beam producing, focusing, and/or amplifying means and complicated deflection means.

In the case of a thin CRT display device having a flat face plate and rear plate the atmospheric pressure exerts a great force on the face plate and on the rear plate. The larger the dimensions of the display screen, the thicker the face plate and the rear plate must be, if no internal support means are provided.

SUMMARY OF THE INVENTION

In view of the foregoing, it is an object of the invention to provide a flat-panel picture display device which substantially does not have the drawbacks of the above-mentioned devices.

According to the invention, a color picture display device having a vacuum envelope including a front wall with a luminescent screen and a rear wall therefore comprises a plurality of juxtaposed sources for emitting electrons, electron ducts in the rear of the device and cooperating with the sources and having walls of substantially electrically insulating material having a secondary emission coefficient suitable for electron transport for transporting, through vacuum, electrons in the form of electron currents, means for withdrawing each electron current at predetermined (particularly successive) locations from its duct and means for directing said current toward a desired location on the luminescent screen, said luminescent screen having a repetitive pattern of triplets of phosphor elements luminescing in different colors (for example, red, green and blue), a flu-spacer structure of electrically insulating material being arranged adjacent to the luminescent screen. A flu-spacer structure is herein understood to mean a spacer which is adjacent to the luminescent screen.

The inventive approach of providing a flat-panel picture display device is based on the discovery that electron transport is possible when electrons impinge on a wall of an elongate evacuated cavity (referred to as compartment) defined by walls of high-ohmic, substantially electrically insulating material (for example, glass) if an electric field of sufficient power is realised in the longitudinal direction of the compartment (by, for example, applying an electric potential difference across the ends of the compartment). The impinging electrons then generate secondary electrons by wall interaction which are attracted to a further wall section and in their turn generate secondary electrons by wall interaction. As will be further described, the circumstances (field strength, electrical resistance of the walls, secondary emission coefficient $\delta$ of the walls) may be chosen to be such that a constant vacuum current will flow in the compartment.

By withdrawing electrons at desired locations (via apertures) from the compartments and directing them towards a luminescent screen, for example, by means of an accelerating field, a picture can then be formed on the luminescent screen.

The maximal landing reserve is obtained by forming the color pattern on the luminescent screen as a delta configuration (triplets arranged in a triangular form). This landing reserve may be, for example, larger than in the case of a screen with color lines. Moreover, in the case of matrix-oriented displays with a screen of color lines, artifacts may occur in the picture (for example, a striped structure), which artifacts are now avoided.

A first embodiment is characterized in that the means for directing each electron current to a desired location on the luminescent screen comprises an apertured selection plate of electrically insulating material separated from the luminescent screen by the flu-spacer structure, each aperture of the selection plate being associated with one of the phosphor elements via an aperture in the flu-spacer structure which may be plate-shaped or honeycomb-shaped, for example. The desired vacuum support is now obtained by the combination: side walls of the electron duct-selection plate-flu-spacer structure.

The flu-spacer structure may be, for example, a system of mutually parallel walls extending at an angle (of approximately 60°) to the side walls of the electron ducts. This is possible because of the delta configuration of the phosphor elements and leads to a stabler construction than in the case where the side walls and the spacer walls would be parallel.

A preferred embodiment is, however, characterized in that the flu-spacer structure comprises a plate-shaped or honeycomb-shaped structure having apertures which correspond to the phosphor elements. These apertures associate each phosphor element with one aperture in the adjacent selection plate. In addition to a greater stability, the use of these structures has the extra advantage that electrons backscattered from the luminescent screen cannot land on other phosphor elements, which leads to a better contrast and a better color purity.

A selection means is provided by providing the apertures in the selection plate row by row with electrodes which are energizable by means of a first (positive) electric voltage (pulse) so as to withdraw electron currents from the ducts via the apertures of a row, or they are energizable by means of a second (lower) electric voltage if no electrons should be locally withdrawn from the ducts. The electrons extracted by this selection means can be directed towards the screen by applying an acceleration voltage.

All electron currents generated by the electron sources should be guided in the electron ducts across at least a part of the height towards the upper edge or the lower edge of the luminescent screen. For this purpose one row of electron sources or a plurality of parallel rows of electron sources may be provided.

Each of these electron sources may be placed within the electron duct with which it cooperates, or they are alternatively located at the outer side, opposite an entrance portion, of the electron duct with which they cooperate.

By applying a sufficiently large positive voltage difference between an electron source and the entrance portion of an electron duct cooperating therewith, the emitted electrons are accelerated towards the electron duct, whereafter they generate secondary electrons in the electron duct by means of wall interaction.

Electrons which are line-sequentially withdrawn from the electron ducts can be accelerated (as beams) towards the luminescent screen by a applying a sufficiently large voltage difference between the electron ducts and the screen, for example, a difference of 3 kV. One picture line at a time can thus be written. The video information (grey scales) can be presented, for example, in the form of pulse width modulation. The distance to the screen may be very small so that the spot remains small.

BRIEF DESCRIPTION OF THE DRAWINGS

These and other aspects of the invention will be apparent from and elucidated with reference to the embodiments illustrated in the drawing and described hereinafter. Identical reference numerals are used for corresponding components. In the drawing:

FIG. 1 is a diagrammatic perspective elevational view, partly broken away, of a part of a construction of a picture display device according to the invention, with electron ducts, a selection plate and a flu-spacer structure, whose components are not drawn to scale;

FIG. 1A is a side elevation, broken away, of the construction of FIG. 1 to illustrate the general operation of the device according to the invention;

FIG. 1B is a front elevation of a part of the apertured selection plate used in the construction of FIG. 1, FIG. 1C is an elevational view of a part of a selection plate provided with selection electrodes, viewed through the apertures in an adjacent flu-spacer structure.

DESCRIPTION OF THE PREFERRED EMBODIMENTS

Figure 2:
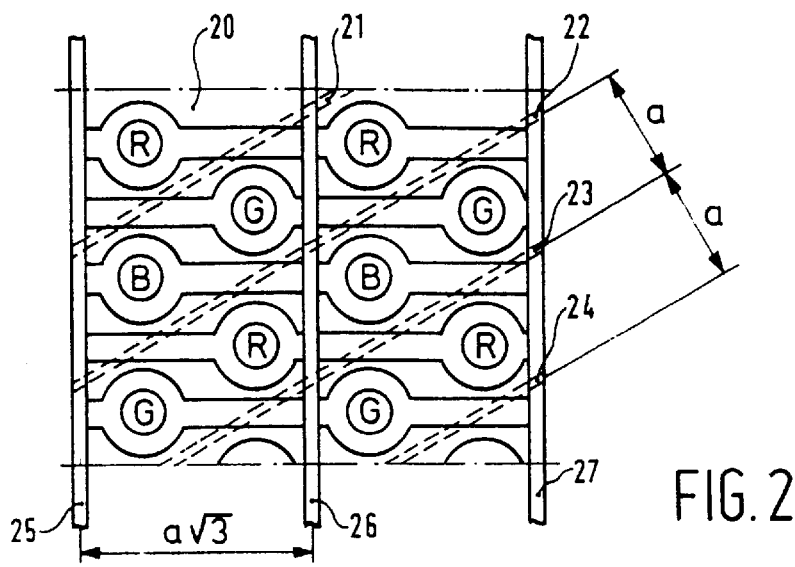
FIG. 2 shows a similar selection plate as FIG. 1B for an alternative construction.

FIGS. 1 and 1A show a flat-panel picture display device 1 according to the invention having a display panel (window) 3 and a rear wall 4 located opposite said panel. A luminescent screen 7 having a repetitive pattern of triplets of red (R), green (G), and blue (B) luminescing phosphor elements, as shown in the inset, is arranged on the inner surface of window 3. In the relevant case the dot-shaped phosphor elements of a triplet are located at the apexes of an equilateral triangle with side a. An electron source arrangement 5, for example, a line cathode which by means of electrodes provides a large number of electron emitters, for example 600, or a similar number of separate emitters, is present proximate to a wall 2 which connects panel 3 and the rear wall. Each of these emitters is to provide a relatively small current so that many types of cathodes (cold or thermal cathodes) are suitable as emitters. The emitters may be arranged jointly or separately. They may have a constant or controllable emission. The electron source arrangement 5 is arranged opposite entrance apertures of a row of electron ducts extending substantially parallel to the screen, which ducts are constituted by compartments 6, 6', 6", . . . etc., in this case one compartment for each electron source. These compartments have cavities 11, 11', 11", . . . defined by walls. At least one wall (preferably the rear wall) of each compartment is made of a material which has a suitable high electrical resistance for the purpose of the invention (for example, ceramic material, glass, synthetic material—coated or uncoated) and which has a secondary emission coefficient δ>1 over a given range of primary electron energies (see FIG. 3). The electrical resistance of the wall material has such a value that a minimum possible total amount of current (preferably less than, for example, 10 mA) will flow in the walls in the case of a field strength in the axial direction in the compartments on the order of one hundred to several hundred volts per cm required for the electron transport. By applying a voltage on the order of several dozen to several hundred volts (value of the voltage is dependent on circumstances) between the row 5 of electron sources and the compartments 6, 6', 6", electrons are accelerated from the electron sources towards the compartments, whereafter they impinge upon the walls in the compartments and generate secondary electrons.

The invention is based on the recognition that vacuum electron transport within compartment having walls of electrically insulating material is possible if an electric field ($E_y$) of sufficient power is applied in the longitudinal direction of the compartment. Such a field realises a given energy distribution and spatial distribution of electrons injected into the compartment so that the effective secondary emission coefficient $δ_{eff}$ of the walls of the compartment will on average be equal to 1 in operation. Under these circumstances one electron will leave for each electron which enters (on average); in other words, the electron current is constant throughout the compartment and is approximately equal to the current which enters. If the wall material is high-ohmic enough (which is the case for all appropriate untreated glass types as well as for Kapton and Pertinax electrically insulating materials and for ceramic materials), the walls of the compartment cannot produce or take up any net current so that this current, even in a close approximation, is equal to the entering current. If the electric field is made larger than the minimum value which is required to obtain an effective secondary emission coefficient $\delta_{eff}=1$, the following will happen. As soon as $\delta_{eff}$ becomes slightly larger than 1, the wall is charged inhomogeneously positively (due to the very small conductance this charge cannot be depleted). As a result, the electrons will reach the wall earlier on average than in the absence of this positive charge, in other words, the average energy taken up from the electric field in the longitudinal direction will be smaller so that a state with $\delta_{eff}=1$ adjusts itself. This is a favourable aspect because the exact value of the field is not important, provided that it is larger than the previously mentioned minimum value.

Another advantage is that in the state $\delta_{eff}=1$ the electron current in the compartment is constant and can be made to be very satisfactorily equal via measuring and feedback or via current control for each compartment so that a uniform picture can be realised on the luminescent screen.

The compartment walls facing the luminescent screen 7, which is arranged on the inner wall of the panel 3, are constituted by a selection plate 10 (see FIG. 1A) in the embodiment of FIG. 1. The selection plate 10 has extraction apertures 8, 8', 8", . . . etc. Individually driven emitters are preferably used in combination with a pattern of parallel, apertured strip-shaped selection electrodes 9, 9', 9", . . . to be energized by a selection voltage. These electrodes are present on one of the main surfaces of the selection plate 10, or on both main surfaces. In both cases the walls of the apertures 8, 8', 8", . . . may be metallized. A flu-spacer structure 12, in this case a plate having apertures 14, . . . which form a connection between the apertures 8, 8', 8", . . . and the phosphor elements R, G, B . . . keeps the plate 10 spaced apart from face plate 3 and ensures a lateral localization of extracted electron beams in that the apertures 14, . . . closely surround the electron beam paths. If selection electrodes are arranged on the surface of the plate 10 facing the screen 7, it is advantageous if they entirely cover at least those surface areas 9A, 9A', 9A", which are located between the walls of the apertures 14 of the structure 12 (see, for example FIG. 1C). The selection electrodes 9, 9', 9", . . . are formed for each picture line, for example, in the manner shown in FIG. 1B (pierced electrodes widening at the areas of the apertures 8, 8', 8", . . . ). The material of the electrodes may cover the walls of the apertures 8, 8', 8", . . . Desired locations on the screen 7 can be addressed by means of (matrix) drive of the individual cathodes and the selection electrodes 9, 9', 9", . . . Voltages which increase substantially linearly (as viewed from the cathode side) are applied to the selection electrodes 9, 9', 9", . . . , for example, by means of voltage-dividing resistors. When a picture line must be activated, i.e. when electrons must be withdrawn via apertures in an aperture row from the electron currents flowing behind them in parallel columns, a pulsatory voltage $\Delta U$ can be added to the local voltage. In view of the fact that the electrons in the compartments have a relatively low velocity due to the collisions with the walls, $\Delta U$ may be comparatively low (on the order of, for example, 100 V to 200 V). A voltage difference $V_a$ is applied across the total compartment height so as to supply the transport field.

Figure 3:
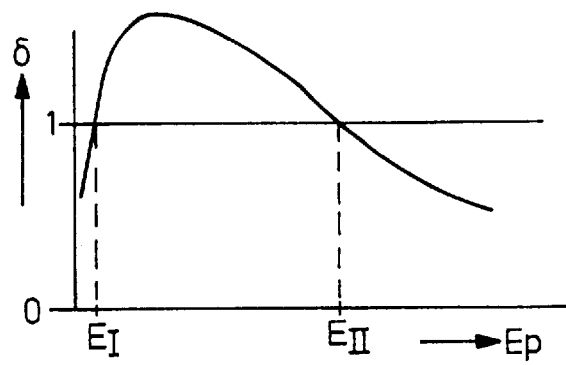
FIG. 3 shows a graph in which the secondary emission coefficient δ as a function of the primary electron energy $E_p$ is plotted for a wall material which is characteristic of the invention.

The materials to be used for the walls of the electron ducts must have a high electrical resistance and a secondary emission coefficient $\delta>1$, see FIG. 3, at least over a certain range $E_I$–$E_{II}$ of primary electron energies $E_p$. $E_I$ is preferably as low as possible, for example, one to several times 10 eV. Inter alia, specific types of glass ($E_I$ is approximately 30 eV), ceramic material, and Pertinax and Kapton electrically insulating materials meet this requirement. Materials which do not meet this requirement may be provided, for example, with a suitable coating (of, for example, MgO).

The electrical resistance depends on whether only electron guidance both such guidance and amplification (over a part or over the total length) of the electron ducts is desired, and on how much total current may flow in the walls in connection with the power to be dissipated.

The mode using electron guidance only is preferred. The electrical resistance may then be in the range between $10^6$ and $10^{15}$ Ω. As an alternative the cathode-sided portion of the electron ducts may have a relatively low resistance, for example, in the range between 10 kΩ and 100 kΩ so as to ensure amplification. At the above-mentioned values the required power can remain below 100 W.

In a given case electron transport was realised in a compartment of lead glass with a length of 17 cm and a bore of 1 mm diameter (electrical resistance measured over the length $>10^{15}$ Ω) by applying an electric voltage of 3.5 kV across the ends.

It is further to be noted that the walls of the ducts may consist of an electrically insulating material which has a constructive function as well as a secondary emission function. Alternatively, they may consist of an electrically insulating material having a constructive function (for example, a synthetic material), on which material a layer having a secondary emission function is provided (for example, quartz or glass or ceramic material such as MgO).

The electric voltage across the electron ducts required for electron guidance increases with the length of the ducts. However, this voltage can be reduced by arranging the (line) arrangement of electron sources in, for example, the center instead of near one end of the display device (as in FIG. 1). A voltage difference of, for example, 3 kV can then be applied between the centers of the ducts and their one ends so as to draw the electron current in one direction and subsequently the same voltage difference can be applied between the centers and their other ends so as to draw the electron current in the opposite direction, instead of applying a voltage difference of 6 kV throughout the height when the electron sources are arranged near one end of the display device. The use of a plurality of parallel rows of electron sources is even more advantageous in this respect.

Electrons which are drawn from an aperture in an electron duct by a selection electrode are further directed towards the luminescent screen 7 where one picture line at a time can thus be written. The video information may be applied, for example, in the form of pulse width modulation. For example, a cathode cooperating with an electron duct can be energized for a shorter or longer time. For producing a white pixel, the cathode may be energized, for example, during the entire line period in this case. An alternative is for the cathode to be constantly energized during the entire line period and to control the emission level.

FIG. 2 is an elevational view of a part of a selection plate 20 having apertures and selection strips. The phosphor elements R, G, B etc. of the luminescent screen are visible through the apertures. These elements are arranged in the manner as shown in the inset of FIG. 1. In this case the selection plate 20 does not cooperate with a plate-shaped spacer structure (having a pattern of hexagonal apertures), but with a spacer structure having mutually parallel walls 21, 22, 23, 24, . . . arranged at a pitch a and extending at an angle of approximately 60° to electron duct side walls 25, 26, 27, . . . arranged at a pitch of a√3.

Figure 7:
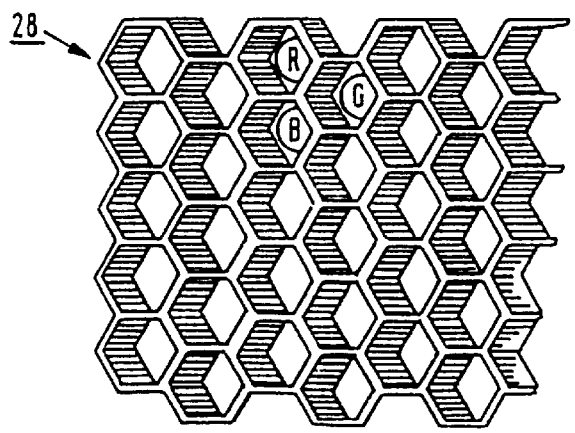
FIG. 7 shows a honeycomb-shaped spacer structure for an alternative construction.

As already noted in the opening paragraph, the use of an apertured, plate-shaped structure or a honeycomb spacer structure has advantages over the use of a spacer structure having walls arranged at an angle of 60°, as far as contrast and color purity are concerned. A part of a honeycomb structure 28 is shown in FIG. 7.

Figure 4:
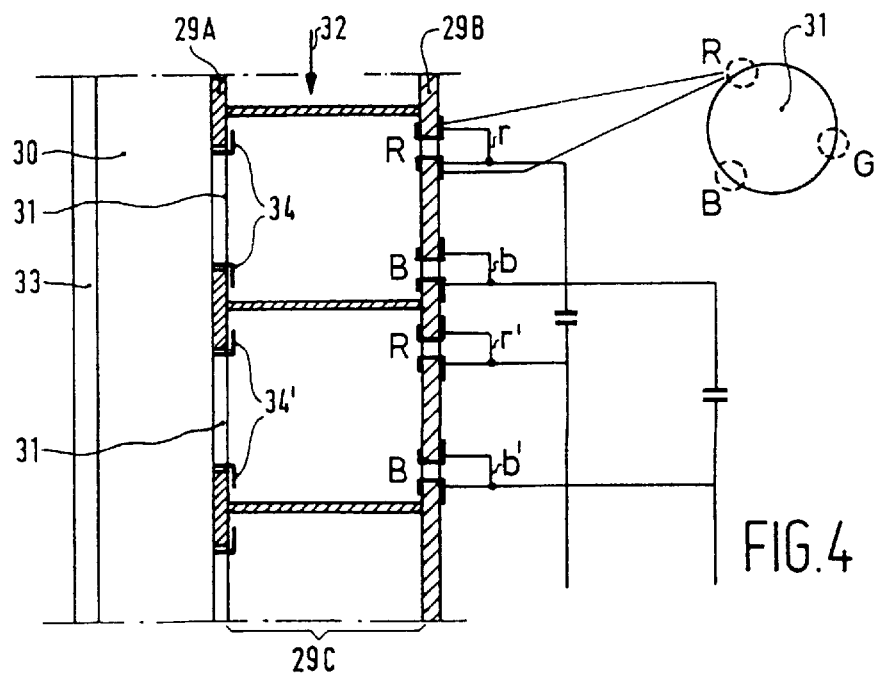
FIG. 4 is a "vertical" cross-section through a part of a construction with selection plates for preselection and fine-selection, which is an alternative to the construction of FIG. 1A.

FIG. 4 shows in a diagrammatical cross-section an embodiment of a part of a display device according to the invention having a selection plate structure 32 which comprises a preselection plate 29A with apertures 31, 31', . . . and a fine-selection plate 29B with apertures R, G, B. In this case three fine-selection apertures R, G, B are associated with each preselection aperture 31, 31', etc. (see inset). Other numbers are also possible. An intermediate spacer structure 29C is arranged between the preselection plate 29A and the fine-selection plate 29B.

Electron transport ducts 30 are formed between the structure 32 and a rear wall. To be able to draw electrons from the transport ducts 30 via the apertures 31, 31', . . . , pierced metal preselection electrodes 34, 34', etc. are arranged on the plate 29A. The walls of the apertures 31, 31', . . . are plated through, but there is little or no metal on the surface of plate 29A at the side where the electrons arrive. This is to ensure that no electrons remain on a selection electrode during addressing (i.e. the electrode should not draw current). Another solution to the problem of drawing current is to ensure that if there is electrode metal on the selection plate surface on which the electrons land, this metal has such a large secondary emission coefficient that the preselection electrodes do not draw any net current.

Similar to the plate 10 of the FIG. 1 construction, the fine-selection plate 29B has (fine-) selection electrodes so as to realise color selection. In this respect it is important that it should be possible to give the color selection electrodes an electric through-connection for each color (for example, via coupling capacitors). In fact, a preselection has already taken place and electrons can no longer reach the wrong location. This means that only one group, or a small number of groups, of three separately energizable color selection electrodes is required for this form of color selection. Although other modes are alternatively possible, the drive is effected, for example, as follows. Both the coarse-selection and the fine-selection electrodes are given a substantially linearly increasing potential (for example, by means of suitable voltage-dividing resistors), the fine-selection electrodes being at a slightly lower potential than the coarse-selection electrodes. One (or more) picture lines are selected by applying a positive voltage pulse of, for example 200 V to the desired coarse-selection electrode. The color pixels are subsequently addressed by applying shorter pulses with an amplitude of, for example, 300 V to the fine-selection electrodes.

The fine-selection plate 29B may be separated from the luminescent screen by one of the afore-mentioned flu-spacer structures (12" in FIG. 1; "21", "22", "23", "24" in FIG. 2; "28" in FIG. 7). The material of the flu-spacer preferably has either a low secondary emission, or a coating having this property should be provided on it. In addition, another condition for a satisfactory operation is important: each (fine-) selection electrode should be dimensioned in such a way that there is no isolator material of the selection plate to be seen when one looks through the spacer apertures, cf. FIG. 1C.

Figure 5:
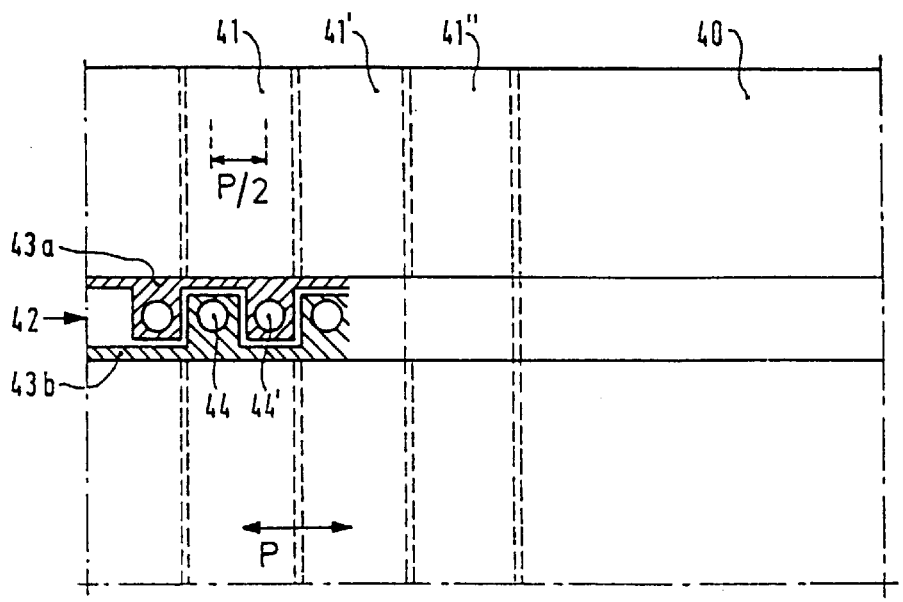
FIG. 5 shows an alternative construction for the preselection.

FIG. 5 shows diagrammatically a part of a selection plate 40 constituting the front wall of transport ducts 41, 41', 41", . . . with a pitch P. The horizontal picture resolution is determined by the pitch of the transport ducts. A better resolution can thus be obtained by reducing this pitch. However, this has the drawback that the voltage difference across the length of the ducts required for transporting the electron currents will increase, which is not always desirable. This problem can be solved by means of an adapted pattern of selection apertures and electrodes, in which the pitch of the transport ducts is unmodified, as will be illustrated with reference to FIG. 5.

Figure 6:
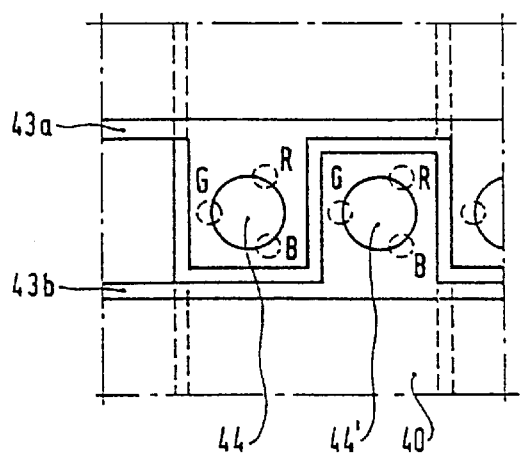
FIG. 6 shows a detail of FIG. 5.

FIG. 5 shows the case where two preselection apertures are provided for each preselection location in each row, with a pitch (p/2). Each selection electrode 42 is divided in the manner shown into two apertured sub-electrodes 43a and 43b, which simplifies contacting. In this way the horizontal resolution can be doubled with respect to the construction shown in FIG. 4, while the transport ducts 11, 11', 11", . . . cooperating with one electron emitter each can be operated in the same way and with the same voltages. Three fine-selection apertures in a fine-selection plate for selecting the colors red (R), green (G) and blue (B) are associated with each preselection aperture 44, 44', . . . , for example, as shown in FIG. 6. The system described herein can be operated in the multiplex mode. This means that, for example, two parallel electron currents and six luminescent elements can be driven (multiplexed) in one line period by means of one electron emitter. Other multiplex modes are alternatively possible.

What is claimed is:

1. A display device comprising an envelope including a surface bearing a luminescent screen having a multiplicity of predefined areas and means for selectively energizing respective ones of said areas to produce an image, characterized in that said display device comprises:
   a. electron emitting means;
   b. at least one electron transport duct which has an electron-receiving portion in communication with the electron emitting means, has a plurality of output apertures, and has an inner surface which is formed, over a substantial length of the duct, from an insulating material having a secondary emission coefficient which is equal to at least one at every electron energy level within a predetermined range of electron energies;
   c. means for producing within said duct an electric field with a predetermined field strength for effecting the transport of electrons from the electron-receiving portion to the vicinities of the output apertures by way of electron interactions with said inner surface of insulating material at energies within said predetermined range;
   d. selection means for selectively effecting the extraction of electron currents from the output apertures; and
   e. a supporting spacer arranged between the luminescent screen and the at least one electron transport duct and including a plurality of openings for permitting electrons to pass from the output apertures to the predefined areas of the luminescent screen.

2. A display device comprising an envelope, including a surface bearing a luminescent screen having a multiplicity of predefined areas, and electron source means for selectively energizing respective ones of said predefined areas to produce an image, characterized in that said display device comprises:
   a. at least one electron transport duct defined by at least one wall surface comprising a material having a predetermined secondary emission coefficient;
   b. electron producing means arranged for providing electrons in the at least one duct;
   c. means for establishing a predetermined electric field within the at least one duct to effect production of an electron current by secondary emission from said material;

d. wall means having output apertures disposed in communication with said predefined screen areas and the at least one duct;

e. a supporting spacer arranged between the luminescent screen and the wall means and including a plurality of openings for permitting electrons to pass from the output apertures to the predefined areas of the luminescent screen; and f. selection means for selectively effecting extraction of electron currents from the at least one duct for propagation through said apertures and toward said screen.

3. A display device comprising a luminescent screen and means for selectively energizing predetermined areas of said screen, characterized in that said means comprises at least one electron transport duct having a surface comprising a material having a predetermined secondary emission coefficient, electron source means for providing electrons in the at least one electron transport duct, means for promoting propagation of electrons along a predetermined path within the at least one electron transport duct by secondary emission from said material, selection means for extracting electron currents from selected output apertures of said at least one duct located along said path to selectively energize said screen areas, and a supporting spacer arranged between the luminescent screen and the selectiion means and including a plurality of openings for permitting electrons to pass from the output apertures to the predefined areas of the luminescent screen.

4. A display device comprising an envelope including a surface bearing a luminescent screen having a multiplicity of predefined areas and means for selectively energizing respective ones of said areas to produce an image, characterized in that said display device comprises:

a. electron emitting means;

b. at least one electron transport duct which has an electron-receiving portion in communication with the electron emitting means, has a plurality of output apertures, and has an inner surface which is formed, over a substantial length of the duct, from an insulating material having a secondary emission coefficient which is greater than one for a predetermined range of electron energies;

c. means for producing within said duct an electric field with a predetermined field strength for effecting the transport of electrons from the electron-receiving portion to the vicinities of the output apertures by way of electron interactions with said inner surface of insulating material at energies within said predetermined range;

d. selection means for selectively effecting the extraction of electron currents from the output apertures; and e. a supporting spacer arranged between the luminescent screen and the at least one electron transport duct and including a plurality of openings for permitting electrons to pass from the output apertures to the predefined areas of the luminescent screen.

5. A display device as in claim 1, 2, 3 or 4 where the selection means comprises a selection plate including apertures which are arranged to pass the extracted electron currents, said plate being separated from the luminescent screen by the supporting spacer.

6. A display device as in claim 5 where each of the apertures in the selection plate is associated with a respective one of the predefined areas of the luminescent screen.

7. A display device as in claim 5 where the selection plate forms a wall of the at least one electron transport duct.

8. A display device as in claim 7 where the apertures in the selection plate correspond with the output apertures.

9. A display device as in claim 1, 2, 3 or 4 where the selection means comprises:

a. a first selection plate having apertures which are arranged to pass the extracted electron currents;

b. a second selection plate having at least two apertures associated with a respective one of the apertures in the first selection plate; and c. an intermediate supporting spacer arranged between the first and second selection plates and including a plurality of openings for permitting electrons to pass from the apertures in the first selection plate to respective associated apertures in the second selection plate.

10. A display device as in claim 9 where each of the apertures in the second selection plate is associated with a respective one of the predefined areas of the luminescent screen.

11. A display device as in claim 9 where the first selection plate forms a wall of the at least one electron transport duct.

12. A display device as in claim 11 where the apertures in the first selection plate correspond with the output apertures.

13. A display device as in claim 9 where each of the predefined areas of the luminescent screen comprises a triplet of red, green, and blue-luminescing elements, where each of the apertures in the first selection plate is associated with a respective group of three of the apertures in the second selection plate, and where the three apertures in each of said groups are associated with respective ones of three luminescing elements in one of said triplets.

14. A display device as in claim 5 where the apertures in the selection plate are arranged in rows, and where said selection plate bears a plurality of rows of strip-shaped electrodes having apertures which coincide with respective ones of the selection plate apertures.

15. A display device as in claim 9 where the apertures in the first selection plate are arranged in rows, and where said first selection plate bears a plurality of rows of strip-shaped electrodes having apertures which correspond with respective ones of the first selection plate apertures.

16. A display device as in claim 1, 2, 3 or 4 where the openings in the supporting spacer correspond to respective ones of the predefined areas of the luminescent screen.

17. A display device as in claim 1, 2, 3 or 4 where said luminescent screen comprises a pattern of phosphor materials for luminescing in a plurality of different colors.

18. A display device as in claim 1, 2, 3 or 4 where said luminescent screen comprises a repetitive pattern of triplets of red, green and blue-luminescing elements.

19. A display device as in claim 18 where each of said predefined areas of the luminescent screen comprises one of said triplets.

20. A display device as in claim 18 where each of said predefined areas of the luminescent screen comprises one of said red, green and blue-luminescing elements.

21. A display device as in claim 18 where each of said predefined areas of the luminescent screen comprises a plurality of said red, green and blue-luminescing elements.

22. A display device as in claim 9 where said at least one electron transport duct comprises a plurality of said ducts arranged in columns, and where the apertures in the selection plate are arranged in rows, each of said rows comprising groups of adjacent ones of said apertures, each of said groups of apertures communicating with a common one of the ducts.

23. A display device as in claim 22 where each of said groups comprises two of said apertures in the selection plate.

24. A display device as in claim 9 where said at least one electron transport duct comprises a plurality of said ducts arranged in columns, and where the apertures in the first selection plate are arranged in rows, each of said rows comprising groups of adjacent ones of said apertures, each of said groups of apertures communicating with a common one of the ducts.

25. A display device as in claim 24 where each of said groups comprises two of said apertures in the selection plate.

26. A display device as in claim 25 where each of the predefined areas of the luminescent screen comprises a triplet of red, green, and blue-luminescing elements, and where each of the apertures in the second selection plate has three apertures associated with a respective one of the apertures in the first selection plate and with a respective one of said triplets.

27. A display device as in claim 14 where the rows of strip-shaped electrodes are disposed on a side of the selection plate facing the luminescent screen.

28. A display device as in claim 27 where the openings in the supporting spacer are wider than the apertures in the selection plate and where at least areas of the selection plate visible through said openings are covered by said strip-shaped electrodes.

29. A display device as in claim 15 where the rows of strip-shaped electrodes are disposed on a side of the selection plate facing the luminescent screen.

30. A display device as in claim 29 where the openings in the intermediate supporting spacer are wider than the apertures in the first selection plate and where at least areas of said first selection plate which are visible through said openings are covered by said strip-shaped electrodes.

31. A display device as in claim 1, 2, 3 or 4 where, in operation, the surface produces secondary electrons at a rate which is substantially equal to a rate at which impinging primary electrons are collected at said surface.

32. A display device as in claim 1, 2, 3 or 4 where the supporting spacer comprises a plate-shaped structure having apertures defining said openings.

33. A display device as in claim 1, 2, 3 or 4 where the supporting spacer comprises a honeycomb-shaped structure.

* * * * *